United States Patent [19]

Doerfler

[11] 4,221,437
[45] Sep. 9, 1980

[54] BRAKE PROPORTIONING APPARATUS

[75] Inventor: Roger E. Doerfler, Romulus, Mich.

[73] Assignee: Kelsey Hayes Co., Romulus, Mich.

[21] Appl. No.: 971,753

[22] Filed: Dec. 21, 1978

Related U.S. Application Data

[63] Continuation of Ser. No. 794,604, May 6, 1977, abandoned.

[51] Int. Cl.² .............................................. B60T 13/00
[52] U.S. Cl. .................................. 303/6 C; 303/22 R
[58] Field of Search .................. 303/6 C, 22 R, 23 R; 188/349; 251/14; 267/61 R

[56] References Cited

U.S. PATENT DOCUMENTS

| 3,649,084 | 3/1972 | Stelzer | 303/22 R |
|---|---|---|---|
| 3,727,902 | 4/1973 | Burckhardt | 267/61 R |
| 3,771,837 | 11/1973 | Budzich | 188/349 |
| 4,120,489 | 10/1978 | Borlinghaus | 267/61 R |

Primary Examiner—Trygve M. Blix
Assistant Examiner—Reinhard J. Eisenzopf
Attorney, Agent, or Firm—Ralph J. Skinkiss

[57] ABSTRACT

A brake proportioning apparatus which restricts and proportions the application of brake pressure to the wheels of a vehicle under certain conditions is provided. Spring forces and spring rates are utilized to provide a differential brake force to a proportioning valve and provide linear or non-linear programming of fluid pressure.

13 Claims, 14 Drawing Figures

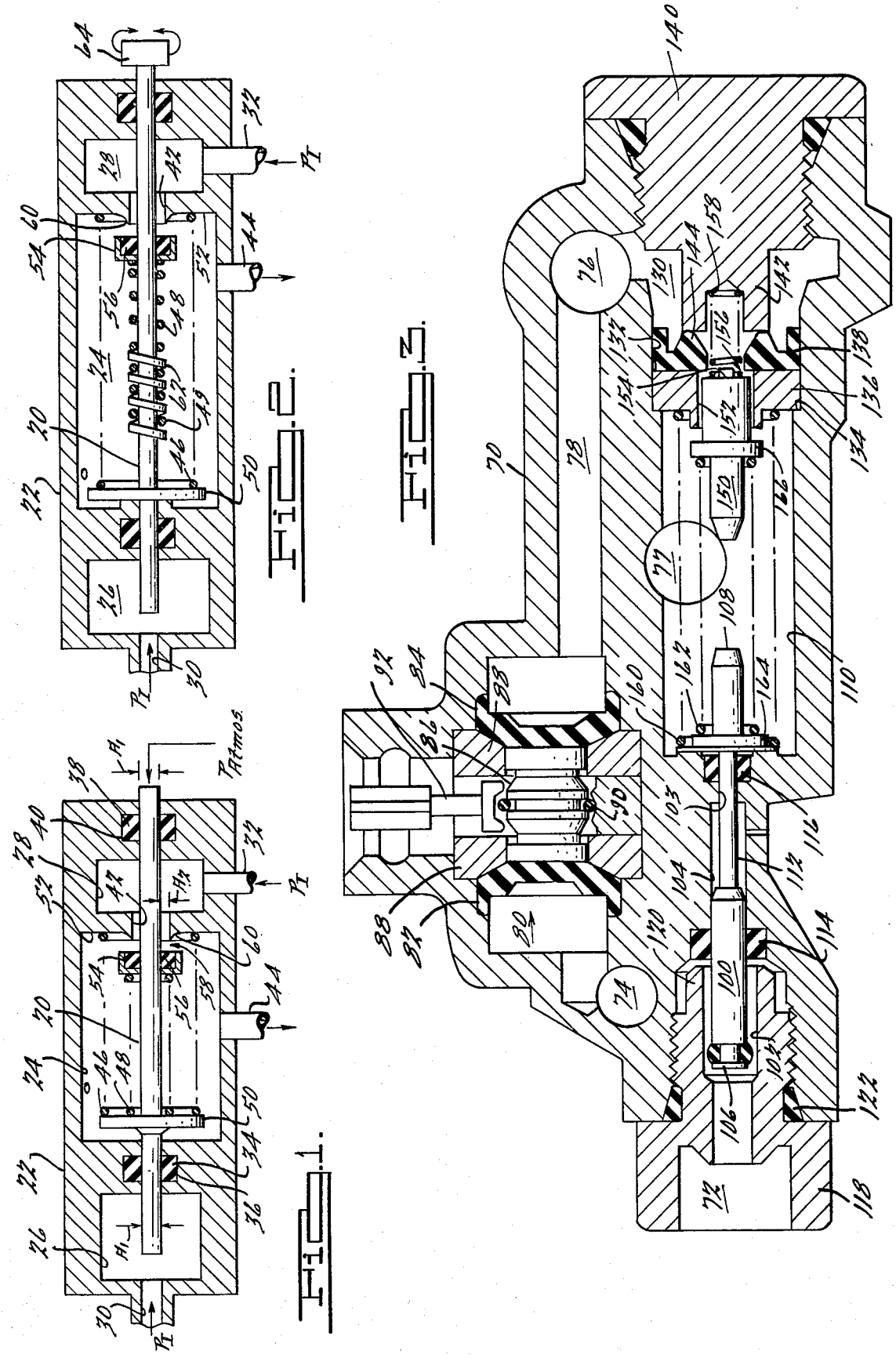

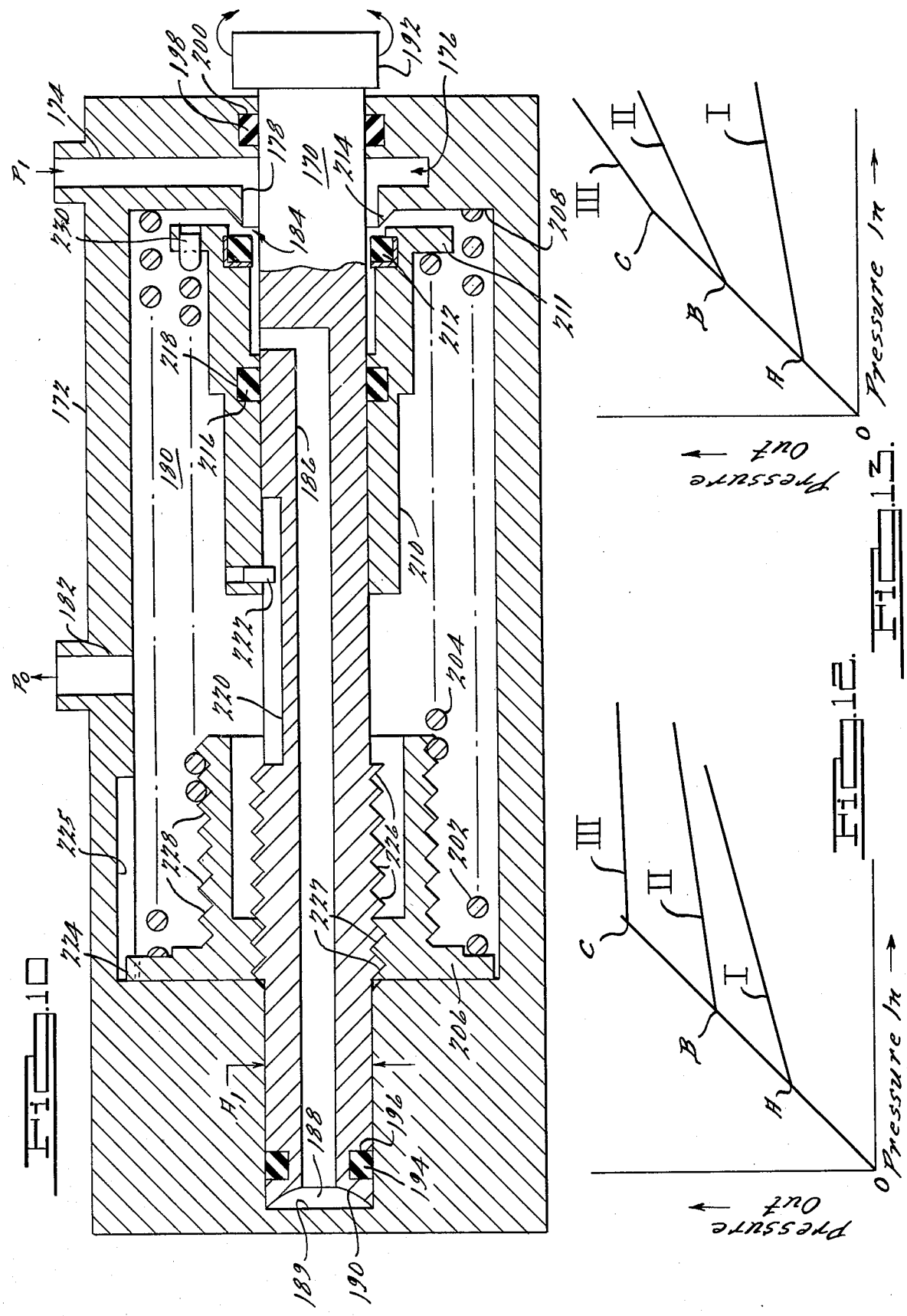

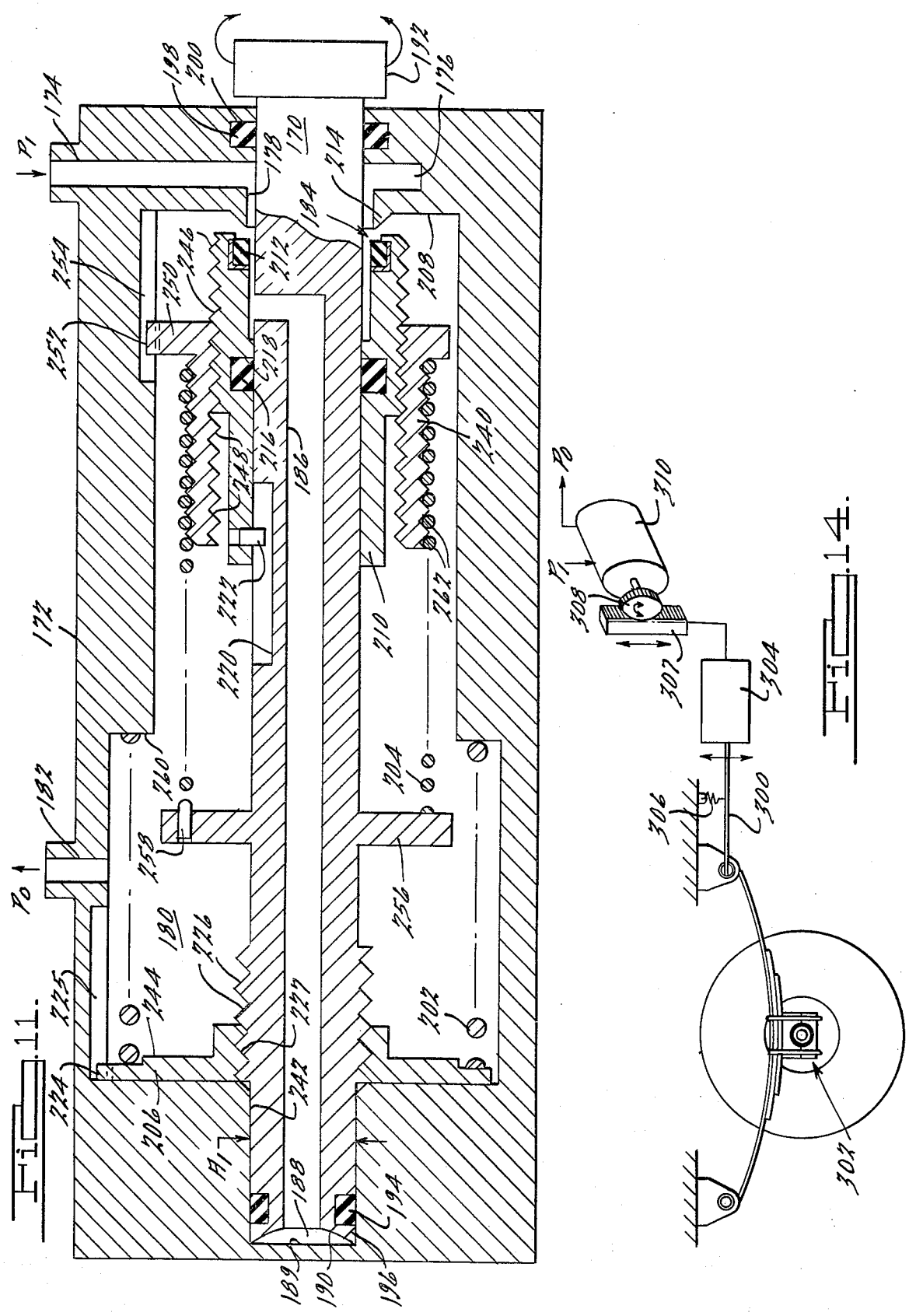

BRAKE PROPORTIONING APPARATUS

This is a continuation of application Ser. No. 794,604, filed May 6, 1977, now abandoned.

BACKGROUND-SUMMARY OF THE INVENTION

The invention relates to an improved brake proportioning apparatus for limiting, restricting and proportioning the application of brake pressure to the wheels of a vehicle under certain conditions.

Devices commonly used to program fluid pressure in brake systems comprise fixed ratio pressure reducing valves. These devices function as a result of an area relationship and as such are capable of only responding linearly to a linear input. Further, as the reduction ratio approaches either unity or zero, the devices become significantly difficult to design and to maintain within pescribed operating conditions.

An object of the present invention is to overcome the disadvantages of known brake proportioning devices. Another object is to provide a brake proportioning device which can provide non-linear programming of fluid pressure to the wheel cylinders. Still another object is to provide a brake proportioning apparatus which is not limited to functioning as a result of a fixed area or ratio relationship and which utilizes spring rates and spring forces in its operation.

A further object of the present invention is to provide a device which can provide either linear or non-linear proportioning of brake fluid. A still further object is to provide a device in which the programming of fluid pressure can be adjusted and the device thus can be utilized with a wide range of vehicle sizes, weights and loading characteristics.

The above and other objects are achieved in accordance with a preferred embodiment of the invention in which a pair of springs are utilized as the differential force mechanism to proportion the flow of fluid pressure through a valve. The springs, which can be either linear or variable in pitch, operatively cooperate with a piston and valve to provide the desired linear and/or non-linear programming of fluid pressue in the device.

Other objects, features, advantages and embodiments of the invention will become apparent from a review of the following specification, drawings and claims.

BRIEF DESCRIPTION OF THE DRAWINGS

FIG. 1 illustrates one embodiment of the invention;

FIG. 2 illustrates another embodiment of the invention;

FIG. 3 illustrates still another embodiment of the invention;

FIGS. 10 and 11 illustrate further embodiments of the invention;

FIGS. 12 and 13 are graphs illustrating the operation of the embodiments shown in FIGS. 10 and 11; and FIG. 14 illustrates a still further embodiment of the invention.

DESCRIPTION OF THE PREFERRED EMBODIMENTS

Figure 4:
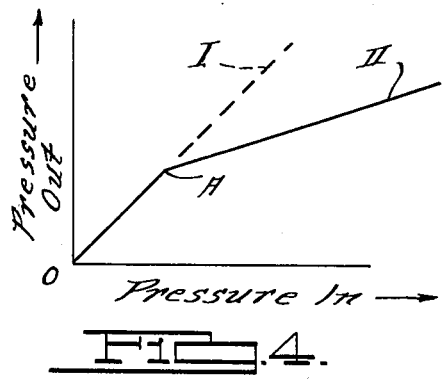
FIG. 4–9 are graphs illustrating the manner in which the embodiments of the invention operate.

In FIG. 1, a piston 20 is slidably mounted in a housing 22. The housing 22 has a central chamber 24, flanked by two smaller chambers 26 and 28. The piston 20 extends through all three chambers in the housing 22. The chamber 26 on the left side of the housing (as viewed in accordance with FIG. 1) has an inlet 30 which is connected to the master cylinder of the brake system and exposed on inlet pressure $P_I$. One end of the piston 20 is positioned in the chamber 26 and has a cross-sectional area $A_1$ exposed to the inlet pressure $P_I$. The opposite end of piston 20 extends outside the housing 22 and is exposed to atmospheric pressues $P_{ATMOS}$.

An O-ring 34 or similar sealing member is positioned around piston 20 in a cavity 36 and prevents fluid from passing between chambers 24 and 26. Similarly, an O-ring 38 is positioned around piston 20 in a cavity 40 at the right side of the housing 22; this prevents fluid in chamber 28 from leaking out of the end of the housing.

Chamber 28 on the right side of the housing has an inlet 32 which is also connected to the master cylinder (inlet) pressure $P_I$. The fluid pressure introduced into chamber 28 communicates via opening 42 around piston 20 into the central chamber 24. An outlet 44 transmits the fluid pressure force in chamber 28 to the brake cylinders on the vehicle's wheels for activation thereof.

In chamber 24, two springs 46 and 48 are mounted coaxially around piston 20. A plate 50 is securely mounted to the piston 20 and provides a seat for one end of the springs 46 and 48. The opposite end of spring 46 is seated against wall 52 of the housing 22, while the opposite end of spring 48 engages a cup-shaped retainer 54 positioned on the piston 20. The outer spring 46 is preloaded and reacts against the housing 22 with a force $F_1$ urging the piston 20 to the left as shown in FIG. 1. The inner spring 48 is not preloaded and thus is in a relaxed state when it is positioned between plate 50 and retainer 54 (and the plate and retainer are in the positions shown in FIG. 1). An annular sealing member 56 is positioned on piston 20 and held in place by the retainer 54. The seal 56 and retainer 54 are slidably mounted on the piston. When the brake proportioning apparatus is in operation, the seal 56 cooperates with wall 52 around the opening 42 to form a valve 58.

The free length of the spring 48, plus the thickness of the seal 56, retainer 54 and spring seat 50, are less than the length of the central chamber 24 in the housing 22. This allows for fluid communication between chambers 24 and 28 through passageway 42 when the inlet pressure $P_I$ has a low value.

When pressure is introduced in the braking system and thus through inlets 30 and 32, a force equal to $P_I A_1$ is developed on the piston 20 urging it rightwardly in FIG. 1. This is opposed by the preloaded force of spring 46 ($F_1$). When these forces become equal, that is, when $P_I A_1 = F_1$, the piston 20 will be in equilibrium and will force the slidable seal 56 against wall 52. The device is designed so that this will occur at a predetermined pressure level and the valve 58 will close and fluid communication between the inlet 32 and outlet 44 will be interrupted. In this regard, in order to provide a more satisfactory valve seat between seal 56 and wall 52, an annular lip or projection 60 is provided around the periphery of the opening 42.

When the piston 20 is in equilibrium, that is, when equal pressure conditions exist in both the inlet and outlet chambers, all incremental increases in pressure in the system are introduced into both inlets 30 and 32 and develop a force of $\Delta P_I A_1$. As the piston 20 moves in response to $\Delta P_I A_1$, the two springs 46 and 48 develop a resisting force ($F_T$) restoring equilibrium. This is written as follows:

$$\Delta P_I A_1 = F_T \tag{1}$$

The total resisting spring force $F_T$ is comprised of the contribution of the force of spring 46 ($F_1$) and the force of spring 48 ($F_2$). Thus:

$$F_T = F_1 + F_2 \tag{2}$$

When the piston 20 has moved rightwardly an incremental distance "$\Delta d$", the spring force $F_1$ and $F_2$ will be a function of deflection, as well as the spring rates $R_1$ and $R_2$ for the springs. Thus:

$$F_1/\Delta d = R_1/1 \text{ or } F_1 = \Delta d \, R_1 \tag{3}$$

and $$F_2/\Delta d = R_2/1 \text{ or } F_2 = \Delta d \, R_2 \tag{4}$$

Since the total spring rate ($R_T$) of springs loaded in parallel is equal to the sums of the individual spring rates ($R_1 + R_2$), the equation then is reached:

$$R_T/1 = F_T/\Delta d \text{ or } F_T = \Delta d \, R_T \tag{5}$$

If it is assumed that:

$$F_T/F_2 = K_1, \tag{6}$$

where $K_1$ is a constant, then substituting from equations (4) and (5) into equation (6), the following equation results:

$$\Delta d \, R_T/\Delta d \, R_2 = K_1 \tag{7}$$

If equations (6) and (7) are equated, $$F_T/F_2 = \Delta d \, R_T/\Delta d \, R_2 \tag{8}$$

and the resulting equation is solved for $F_2$, $$F_2 = F_T(R_2/R_T) \tag{9}$$

then equation (1) can be substituted into equation (9) to get the following:

$$F_2 = \Delta P_I A_1 (R_2/R_T) \tag{10}$$

At the valve 58, the force $F_2$ of spring 48 is opposed by a force generated by $\Delta P_I$ acting against annular area $A_2$ (the area of opening 42 surrounding piston 20). Within wide limits in relationship between areas $A_1$ and $A_2$, the force $F_2$ will be smaller in magnitude than the force generated by $\Delta P_I A_2$. As a result, the pressure will open the valve 58 allowing a pressure rise $\Delta P_R$ in the outlet chamber 24, setting up a force $\Delta P_R A_1$ in opposition to $\Delta P_I A_2$. In the equilibrium condition:

$$\Sigma F_X = 0 = F_2 + \Delta P_R A_2 = \Delta P_I A_2. \tag{11}$$

Solving for $F_2$, $$F_2 = A_2(\Delta P_I - \Delta P_R) \tag{12}$$

and equating equations (10) and (12), results in the following:

$$A_2 = (\Delta P_I - P_R) = \Delta P_I A_1 (R_2/R_T) \tag{13}$$

or $$(A_2/A_1)(\Delta P_I - \Delta P_R) = \Delta P_I(R_2/R_T) \tag{14}$$

Since the ratio of areas $A_1$ and $A_2$ is a constant ($A_2/A_1 = K_2$), the following equation is reached:

$$K_2(\Delta P_I - \Delta P_R) = \Delta P_I(R_2/R_T) \tag{15}$$

By simplifying and rearranging equation (15), the final equation is reached:

$$P_R/P_I = 1 - (R_2/K_2 R_T) \tag{16}$$

In this last equation, $P_R/P_I$ is the proportioning ratio of the apparatus and $K_2$ is the ratio of the areas chosen which is one of design for any given mechanism. As a result, given a certain ratio of areas in a valve, the proportioning ratio may be obtained (and/or changed) by changing the spring rates $R_1$ and $R_2$.

The effect of varying the spring rates on the brake proportioning device shown in FIG. 1 is illustrated in the graphs of FIGS. 4-8. For example, if both spring rates $R_1$ and $R_2$ are linear, the device will proportion the flow of brake pressure to the wheel cylinders in accordance with FIG. 4. In that graph, line I indicates the situation where pressure is applied to the front and rear brakes at an equal rate. Point A is the "split point", that is, the point at which the device begins to proportion or limit the flow of fluid pressure through it. The proportioned pressure is indicated by line II.

Figure 5:
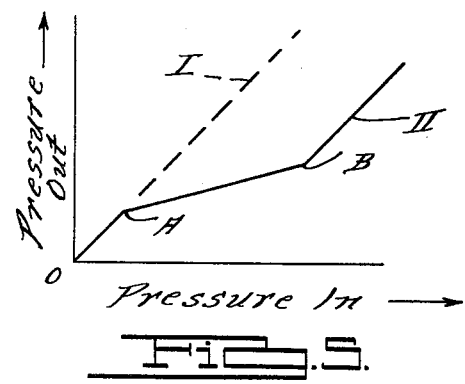

The total spring force $F_T$ can only react up to a maximum pressure, at which point the piston 20 is stopped. If the outer spring 46 is designed such that the coils abut together ("go solid") at a certain point and thus stop the piston 20, the force $F_2$ of the inner spring 48 will remain constant for all additional increases in input pressure. This situation is shown in FIG. 5 where point B on line II indicates the point at which spring 46 goes "solid". The portion of line II subsequent to point B has a slope parallel to the slope of line I and the device merely acts as a check valve during this stage of its operation.

Figure 6:
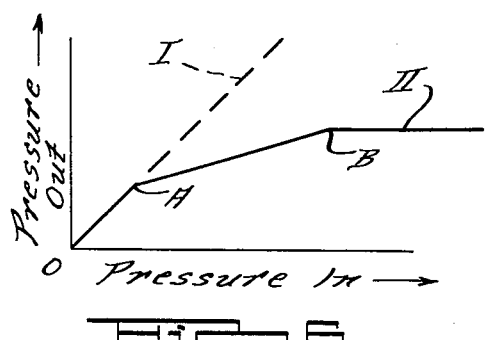

FIG. 6 illustrates the situation where the device is designed such that the inner spring 48 "goes solid" at a certain point (point B on line II). At this point, the valve 58 will remain closed despite further increases in inlet pressure $P_I$ and the outlet pressure will remain at a constant value for the remainder of the braking application.

Figure 7:
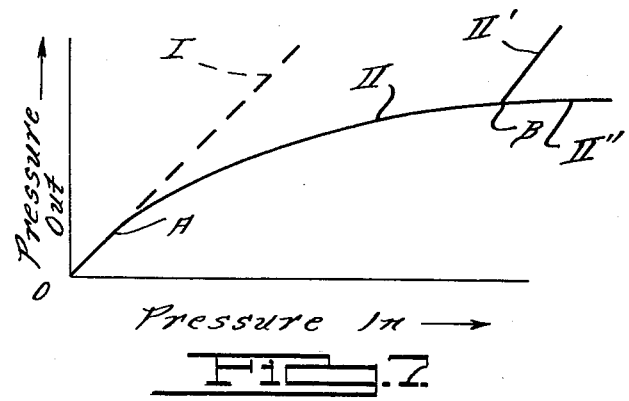

It is also possible to wind either or both of the springs 46 and 48 with variable pitches. In a variable pitch spring, the number of active coils decreases as the spring is compressed. This produces a spring with an increasing spring rate resulting in a non-linear output for the device. The functioning of a valve with a variable pitch spring 48 is shown in FIG. 7. After the split point A, the rate of pressure to the wheels changes in a non-linear manner (as shown by curved line II). Point B in FIG. 7 refers to the situation where one or the other of the springs is compressed to a "solid" condition and the valve either stays open (line II') or closed (line II"). The functioning of the device in either of these situations is similar to that discussed above relative to FIGS. 5 and 6.

Figure 8:
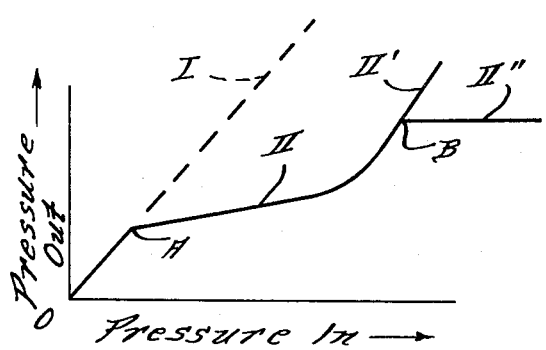

FIG. 8 is similar to FIG. 7, except that it illustrates the device where the outer spring 46 has a variable pitch instead of the inner spring 48 (resulting in an upwardly curved line II).

It is often desirable to provide a proportioning device in which the proportioning ratio can be varied or adjusted for use on different vehicles or in different applications. In this manner, a single type and size of device can be manufactured and used in a whole line of vehicles having different sizes, weights and loading capabilities. Such a device is shown in FIG. 2. In this embodiment, all of the elements which are similar to the elements of the device shown in FIG. 1 are numbered in the same manner. The primary difference between the devices of FIGS. 1 and 2 is that the piston 20 in FIG. 2 has a spiral or screw shaped rib 62 on it which mates and nests with the coils of the inner spring 48. The piston 20 also has a knob 64 mounted on its end outside of the housing so that it can be manually rotated. The end 49 of the spring 48 closest to the plate 50 is secured to the piston 20. Thus, when the piston 20 is rotated via knob 64, the spiral rib 62 compresses or extends the length of the spring 48 along piston 20 adding or deleting the number of active coils in it. In this manner, the spring 48 can either be compressed or extended, as desired, changing its rate of spring force and the resulting proportioning function of the braking device. Preferably, an anti-rotation mechanism should be employed relative to the spring 48; devices including such feature are shown in FIGS. 10 and 11 which are discussed below.

Figure 9:
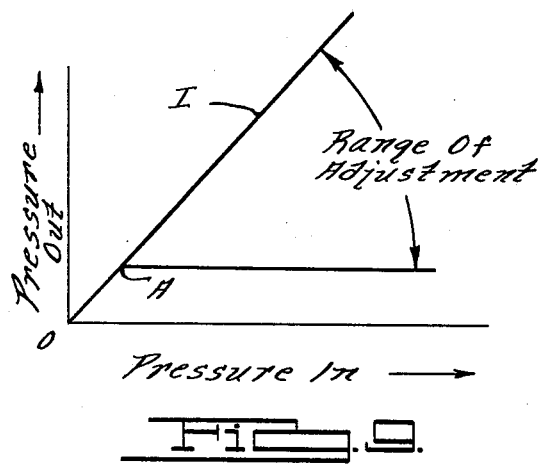

Through the use of the embodiment shown in FIG. 2, it is possible to adjust the proportioning ratio of a braking device within wide limits. This is illustrated in FIG. 9. The use of variable pitch springs for either spring 46 or 48 also would add many variations to the operating characteristics of the device.

The devices shown in FIGS. 1 and 2 can be used in a vehicle with either single or dual braking systems. The pressure $P_I$ entering inlets 30 and 32 could be either from the same master cylinder compartment and brake line, or the pressure introduced into chamber 26 could be from the front brake system, while the pressure introduced in chamber 28 could be from the rear brake system. In the latter arrangement, a failure in the front brake system would render the valve inoperative allowing full pressure to be applied to the rear wheels. This would provide a safety by-pass system where needed.

Another embodiment of the invention is shown in FIG. 3. This is used for dual braking systems. A housing 70 has inlet ports 72 and 74 connected to the front brake system of a vehicle and another inlet port 76 connected to the rear brake system. The housing 70 also has an outlet port 77 which is connected to and a part of the rear brake system.

Inlet port 74 and passageway 78, which is in fluid communication with inlet port 76, are both associated with a differential pressure switch and warning device 80. The device 80 is situated in the upper portion of the housing 70 and operates to warn the operator of the vehicle in the event of a failure of either the front or rear brake systems. The device 80 can be of any conventional type, but preferably is a diaphragm-type differential pressure warning device in accordance with U.S. Pat. No. 3,985,986, which is assigned to the same assignee as the present case.

In accordance with U.S. Pat. No. 3,985,986, one diaphragm 82 is acted upon by the front brake system and a second diaphragm 84 is acted upon by the rear brake system. A movable piston 86 is positioned in a chamber between the diagragms 82 and 84 and is electrically insulated from the housing 70 by a pair of insulating rings or washers 88. A metal ring 90 is positioned on the piston 86 and is adapted to come into contact with member 92 which is in electrical contact with an appropriate warning device (not shown) such as a dashboard light or buzzer. In the event of a failure in either brake system wherein the pressure in one system is reduced significantly, the piston 86 will be displaced axially by the forces acting on the diaphragms toward the chamber having the lower brake pressure. When this happens, the ring 90 will come into contact with the member 92 closing an electrical circuit and in turn activating the warning device.

The lower portion of housing 70 contains a brake proportioning device. A piston 100 is slidingly contained in stepped bores 102, 103 and 104. One end 106 of the piston 100 is in direct communication with inlet port 72 and the other end 108 is positioned in a bore 110. The central portion 112 of the piston 100 has a reduced diameter and is positioned in bores 103 and 104. Bore 102 is in communication with the inlet port 72 and is maintained at inlet pressure. Bore 104 is maintained at atmospheric pressure. O-rings 114 and 116, or other similar sealing members, are provided at the two ends of bore 104 to prevent brake fluid from leaking into it. An end plug 118 is secured in one end of the housing 70 and assists in introducing pressure from the front brake system into inlet 72 and against the end 106 of piston 100. Sealing member 122 provides a seal between the end plug 118 with the housing 70. An axial projection 120 is included on plug 118 and it helps maintain O-ring 114 in position.

At the opposite end of housing 70, the inlet port 76 associated with the rear brake system is in direct communication with chamber 130. Bore 132 is formed in chmber 130. Bore 132 is slightly larger than bore 110 thereby forming a shoulder 134 therebetween. A retainer 136 and sealing member 138 are positioned in bore 132. The retainer 136 and member 138 are securely positioned against shoulder 134 by end plug 140. In this regard, axial projection 142 of plug 140 abuts against a series of raised projections 144 on sealing member 138 forcing the retainer and sealing member against the shoulder. Openings are left between the projections 144 in order to allow fluid to flow freely past projection 142 on plug 140.

A second piston 150 is positioned in the chamber formed by bore 110. The piston 150 is positioned in an opening 152 in retainer 136. The opening 152 is sufficiently large to allow the piston 150 to move axially and fluid to pass around the piston. One end 154 of piston 150 is adapted to engage sealing member 138 under certain operating conditions; the end 154 and sealing member 138 thus define a valve mechanism which is generally indicated by the reference number 156. A spring 158 is positioned between piston 150 and plug 140 and provides a relatively weak spring force in a direction to open the valve mechanism 156. Spring 158 maintains valve 156 in its open position when the brakes are not in operation or at low pressure levels.

Two coaxial springs 160 and 102 are positioned in bore 110. One end of spring 160 rests against flange 164 on piston 100 and the other end rests against retainer 136. Spring 162, on the other hand, is situated between the flange 164 on piston 100 and a corresponding plate or flange 166 on piston 150.

The operation of the brake proportioning device shown in FIG. 3 is similar to the devices shown in FIGS. 1 and 2. In this regard, bore 102 corresponds to chamber 26, bore 110 corresponds to chamber 24 and chamber 130 corresponds to chamber 28. Also, the springs 160 and 162 correspond to springs 46 and 48, respectively. Thus, spring 160 is in a preloaded condition forcing piston 100 to the left, while spring 162 is in its relaxed, free condition. One of the primary differences between the embodiment of FIG. 1 and the embodiment of FIG. 3 is the piston arrangement; in FIG. 3, the piston consists of two parts, 100 and 150, while the piston is in one piece in FIGS. 1 and 2. The operation is similar, however, as the separate piston 150 is similar in function to the sliding retainer and sealing member assembly of FIG. 1.

In order to vary the operation of the device, variable pitch springs can be used for either or both of the springs 160 and 162. Also, the device shown in FIG. 3 can be adapted to shorten or extend the length of spring 162 in order to change the spring rate in a manner similar to that shown and described with reference to FIG. 2.

Preferably, the adjustable embodiment of the invention as shown in FIG. 2 has an anti-rotation mechanism for the coaxial springs. A device including this feature is shown in FIG. 10. In this embodiment, a slidable piston 170 is positioned in a housing 172. Pressure from the master cylinder is admitted into housing 172 through inlet 174. The inlet pressure $P_I$ is passed first into chamber 176, coaxially through bore 178 around piston 170, and into chamber 180. Outlet 182 allows the fluid to pass from the device to the rear wheels of the vehicle. A valve, designated generally by the numeral 184, proportions the pressure in a manner described below between the inlet 174 and the outlet 182. Fluid pressure also is transmitted through central passageway 186 in the piston 170 into chamber 188. Pressure in chamber 188 reacts on one end surface 190 of the piston 170 producing a force on it in a direction to close the valve 184. The opposite end 192 of piston 170 is exposed to the atmosphere outside the housing 172 and has a knob or similar mechanism on it for rotating the piston. An O-ring 194 or similar sealing member is positioned around piston 170 in a cavity 196 and prevents fluid from passing between chambers 180 and 188. Similarly, an O-ring 198 is positioned around piston 170 in a cavity 200 at the opposite end of the piston to prevent fluid in chamber 176 from leaking out of the housing 172.

Two coaxial springs 202 and 204 are positioned around piston 170. These springs are situated and operate in a manner similar to springs 46, 48 and 160, 162 described above with reference to FIGS. 1–9. The outer spring 202 is positioned between adjusting nut 206 (situated on piston 170) and end wall 208 of chamber 180; it is preloaded and resists the force acting on surface 190 ($F_1 = A_1 P_I$). As mentioned earlier, the inner spring (which in FIG. 10 is designated by the numeral 204) is not preloaded and thus normally in a relaxed state when there is little or no fluid pressure applied to the device. When the force $F_1$ reaches a magnitude sufficient to overcome the preload of spring 202, the piston 170 moves rightwardly (as shown in FIG. 10) closing the valve 184 and interrupting the flow between the inlet 174 and outlet 182. Further incremental increases in inlet pressure are reduced proportionately.

A retainer 210 is slidably positioned on piston 170. A sealing member 212 is situated in and held in position by the retainer 210. The seal 212 comprises one part of a valve mechanism 184 and operatively acts with the raised annular lip 214 around bore 178 to form the complete valve. An O-ring 216 is situated in a cavity 218 in retainer 210 to prevent fluid from bypassing valve 184. A key 222 is positioned on retainer 210 and situated in slot 220 in piston 170. The key-and-slot allows the retainer 210 to slide axially along the piston 170 and at the same time rotate with it. A key-and-slot mechanism 224, 225 is also provided relative to the nut 206 and housing 180, although this mechanism prevents the adjusting nut 206 from rotating with the piston 170.

The nut 206 is threadably fastened on piston 170 and appropriate threads 226, 227 are provided for this purpose. The inner spring 204 is positioned between the nut 206 and a flange 211 on the retainer 210. Threads 228 (or a spiral ridge) are provided on the outer surface of adjusting nut 206 and are adapted to mate with the coils of spring 204 at one end thereof. The opposite end of spring 204 is securely fixed in any conventional manner to the retainer 210, such as by key 230. The pitch and hand of spring 204, nut adjusting threads 228 and the piston-nut mating threads 226, 227 are the same.

Assuming a right-handed pitch to the threads 226, 227 and 228, rotating the piston 170 in a clockwise direction will advance the adjusting nut 206 axially along the piston. During rotation, the piston 170 will remain in its stopped position against wall 189 of housing 172 and the spring 202 will become more and more compressed. The retainer 210, together with the inner spring 204, which are both keyed to the piston 170, will rotate with the piston. The identically pitched inner spring 204 will screw onto the mating threads 228 on the advancing nut 206; each full revolution will reduce the active coils by one.

As the nut 206 advances and compresses the outer spring 202, the initial preload of the spring 202 increases and thus the split point of the brake proportioning mechanism is raised. As the elevation of the split point is taking place, the reduction of active coils of the inner spring 204 serves to lower the proportioning ratio in synchronization with such elevation. The operation of the FIG. 10 embodiment is shown in FIG. 12. Point A represents the split point situation where the nut 206 is not advanced at all; in this situation, the device operates similar to the device shown and described relative to FIGS. 1 and 4 and the proportioned pressure is indicated by line I. When piston 170 is turned such that the adjusting nut 206 is advanced approximately one-half way along the threads 226, the split point is raised to Point B and the proportioned pressure is indicated by line II. When the nut is fully advanced, the split point is raised to Point C and the proportioned pressure is indicated by line II.

A further embodiment of an adjustable proportioning device is shown in FIG. 11. Many of the features of FIG. 11 are similar to those shown and described relative to FIG. 10 and are numbered in a similar manner. In addition, the fluid path and proportioning principles are the same. The principal differences relate to the configuration of the adjusting nut 206 and the retainer 210, as well as the addition of an adjusting nut 240 for the inner spring 204.

The piston 170 is slidably positioned in bore 242 on the left side of the housing 172. Male threads 226 on the piston 170 engage female threads 227 on the adjusting nut 206 for the outer spring 202. A radial flange 244 on the nut 206 provides a seat for the outer spring 202 whose initial preload biases the nut and piston to its leftward stop position against wall 189 of housing 172. Assuming a right-handed pitch of the mating threads 226 and 227, rotating the piston 170 in a clockwise direction will advance the nut 206 which is prevented from rotating by key-and-slot mechanism 224, 225. This will raise the split point as mentioned above.

The retainer 210 is slidably mounted on the piston 170 but is also keyed to it via key-and-slot mechanism 220, 222 so that the two parts will rotate together. External male threads 246 are provided on the retainer 210 and engage mating female threads 248 on the inner spring adjusting nut 240. The pitch and hand of mating threads 246, 248 are the same as mating threads 226, 227. A flange 250 extends radially from the adjusting nut 240 and a key 252 thereon engages a slot 254 in the housing 172 preventing rotation of the nut 240. The inner spring 204 is positioned between flange 250 on nut 240 and a radially extending flange 256 is formed on piston 170. The right hand end of the inner spring 204 is threaded upon male threads 262 on adjusting nut 240. The pitch of threads 262 is the same as the other two pairs of mated threads. Also, the end of spring 204 adjacent flange 256 is securely fixed thereto, such as by key 258. The outer spring 202 is positioned between the flange 244 of nut 206 and shoulder 260 of housing 172.

Again, assuming right hand threads, clockwise rotation of the piston 170 will translate outer and inner adjusting nuts 206, 240 rightwardly (in FIG. 11) in synchronization. With both adjusting nuts in the fully leftward position (zero advance), the right hand end of inner spring 204 is fully threaded upon nut 240 abutting radial flange 250. When the piston is rotated, the inner spring 204 also rotates, unthreading from the adjusting nut 240. Each full revolution of the spring 204 adds one active coil to the inner spring. As the ratio of active coils of the inner spring becomes greater in relation to the total number of coils of both inner and outer springs, the proportioning ratio becomes greater.

The operation of the FIG. 11 embodiment is shown in FIG. 13. Point A represents the split point where the piston 170 has not been rotated at all. When the piston is turned such that nuts 206 and 240 are advanced approximately one-half way, the split point is raised to Point B and the proportioned pressure is indicated by line II. When the nuts are fully advanced, the split point is raised to Point C and the proportioned pressure is indicated by line III.

The pistons shown in the above embodiments are rotated and the internal coaxial springs adjusted in order to adapt the operation of the brake proportioning device to the loading of the vehicle. This is preferably accomplished by the rotation of knobs secured to the ends of the proportioning pistons which protrude from the housings. The knobs can be rotated either manually or automatically. If the knobs are rotated manually, this is done by the vehicle manufacturer or operator, depending on the expected use or actual loading of the vehicle. If the pistons are rotated automatically, then an adjusting mechanism adapted to take into account the loading of the vehicle and rotate the proportioning piston preferably is provided.

An atomatically adjusted brake proportioning device is shown schematically in FIG. 14. A lever or other mechanical linkage 300 is attached to the axle, frame, or suspension 302 of the vehicle and provides a direct input of the loading of the vehicle into a control system 304. A spring 306 or other damping mechanism screens out undesired deflections and input from lever 300. It is also possible to include a time delay in the control system 304 such that adjustment of the proportioning device only takes place if the lever 300 remains deflected for a predetermined length of time. The control syste 304 in turn operates an appropriate mechanism, such as toothed plate 307, which in turn rotates knob 308 on the brake proportioning device 310. The device 310 can be any of the adjustable embodiments of the invention described above.

The control 304 can be any conventional type and can be operated mechanically, electrically, pneumatically of hydraulically. Satisfactory mechanical linkages and control systems which could be adapted to operate the present inventive brake proportioning device are shown, for example, in U.S. Pat. Nos. 2,807,338; 3,649,084 and 3,379,479.

While it will be apparent that the preferred embodiments illustrated herein are well calculated to fulfill the objects above stated, it will be appreciated that the present invention is susceptible to modification, variation and change without departing from the scope of the invention as defined in the subjoined claims.

I claim:

1. A hydraulic brake proportioning valve for a motor vehicle having front and rear wheel brake cylinders, comprising:
    a body having hydraulic pressure inlet and outlet means, said inlet means in hydraulic communication with means for generating hydraulic pressure and said outlet means in hydraulic communication with said rear wheel brake cylinders,
    said valve having passage means normally connecting said inlet means to said outlet means,
    a first valve member in said body,
    piston means in said body having an axially slidable circumjacent second valve member thereon normally disengaged from said first valve member to provide a space forming a part of said passage means,
    a first spring biasing said piston means in a direction toward disengagement of said valve members,
    a second spring normally at its free state, but adapted, upon increases in hydraulic pressure beyond a predetermined value to bias said second valve member in a direction toward engagement with said first valve member,
    said piston means in hydraulic communication with said inlet means and having a surface exposed to the hydraulic pressure providing a force on said piston in a direction toward engagement of said valve members,
    whereby, upon further increases in pressure above said predetermined value, said spring biasing forces and such pressure acting against said piston surface will actuate said valve members for the restricted flow of hydraulic fluid to said outlet means to increase the hydraulic pressure in the rear wheel brake cylinder at a rate lower than the rate of pressure increase as generated by said hydraulic pressure generating means.

2. A proportioning valve according to claim 1 wherein said first and second springs are coaxially positioned around said piston means in said body.

3. A proportioning valve according to claim 1 wherein said piston means has support means thereon and one end of each of said first and second springs is positioned against said support means.

4. A proportioning valve according to claim 1 wherein said piston means is comprised of two portions, a first portion having said surface exposed to hydraulic pressure from said inlet means and a second portion having said second valve member thereon.

5. A proportioning valve according to claim 4 wherein said second spring extends from a support means on said first piston portion to a support means on said second piston portion.

6. A proportioning valve according to claim 4 wherein said first spring extends from said support means on said first piston portion to a wall of said body.

7. A proportioning valve according to claim 1 wherein said piston means comprises a single member and said second valve member is slidably mounted on said piston means.

8. A proportioning valve according to claim 7 wherein said second spring extends from a support means on said piston means to said second valve member.

9. A proportioning valve according to claim 1 wherein said first spring is a variable pitch spring.

10. A proportioning valve according to claim 1 wherein said second spring is a variable pitch spring.

11. A proportioning valve according to claim 1 wherein both of said first and second springs are variable pitch springs.

12. A proportional valve according to claim 1 further comprising means associated with said piston means to vary the bias of said second spring.

13. A proportional valve according to claim 12 wherein said piston means is adapted to be rotated in said body and said means to vary the bias comprises a spiral flange on said piston means.

* * * * *